United States Patent [19]

Pejathaya

[11] Patent Number: 5,660,440
[45] Date of Patent: Aug. 26, 1997

[54] LINEAR RECLINER WITH EASY ENTRY MEMORY FEATURE

[75] Inventor: Srinivas Pejathaya, St. Clair Shores, Mich.

[73] Assignee: Fisher Dynamics Corporation, St. Clair Shores, Mich.

[21] Appl. No.: 607,949

[22] Filed: Feb. 28, 1996

[51] Int. Cl.⁶ .................................................. B60N 2/02
[52] U.S. Cl. .................. 297/362.12; 297/361.1; 297/375
[58] Field of Search ................ 297/362.12, 361.1, 297/375, 378.12, 368, 369

[56] References Cited

U.S. PATENT DOCUMENTS

| | | |
|---|---|---|
| 3,328,076 | 6/1967 | Naef . |
| 3,635,525 | 1/1972 | Magyar . |
| 3,736,025 | 5/1973 | Ziegler et al. ............................. 297/369 |
| 3,957,312 | 5/1976 | Bonnaud . |
| 4,065,178 | 12/1977 | Carella et al. . |
| 4,394,047 | 7/1983 | Brunule ................................. 297/362.12 |
| 4,502,730 | 3/1985 | Kazaoka et al. . |
| 4,579,386 | 4/1986 | Rupp et al. ........................... 297/362.12 |
| 4,660,886 | 4/1987 | Terada et al. . |
| 4,799,733 | 1/1989 | Beley et al. . |
| 4,822,101 | 4/1989 | Hosoe . |
| 4,865,386 | 9/1989 | Detloff et al. ............................. 297/375 |
| 4,881,775 | 11/1989 | Rees ..................................... 297/361.1 |
| 4,898,424 | 2/1990 | Bell ................................... 297/395 X |
| 4,925,228 | 5/1990 | Pipon et al. . |
| 5,052,752 | 10/1991 | Robinson ............................. 297/375 X |
| 5,269,588 | 12/1993 | Kunz et al. . |
| 5,280,999 | 1/1994 | Jones et al. .......................... 297/361.1 |
| 5,299,853 | 4/1994 | Griswold et al. .................. 297/361.1 X |
| 5,320,413 | 6/1994 | Griswold et al. .................... 297/362.12 |
| 5,344,215 | 9/1994 | Dahlbacka ............................... 297/375 |
| 5,360,256 | 11/1994 | Miller et al. ........................ 297/361.1 |
| 5,390,981 | 2/1995 | Griswold .............................. 297/378.12 |
| 5,393,123 | 2/1995 | Hernandez et al. .................. 297/378.12 |

Primary Examiner—Peter M. Cuomo
Assistant Examiner—Rodney B. White
Attorney, Agent, or Firm—Harness, Dickey & Pierce, P.L.C.

[57] ABSTRACT

A linear recliner assembly is disclosed that is operable for permitting selective reclining movement of a seatback relative to a seat bottom between an upright position and a fully-reclined position. The linear recliner assembly is further operable to permit the seatback to be pivoted from any reclined position to a forward dumped position. Upon return of the seatback from its forward dumped position, the linear recliner assembly is adapted to relatch the seatback in its previous reclined position.

12 Claims, 4 Drawing Sheets

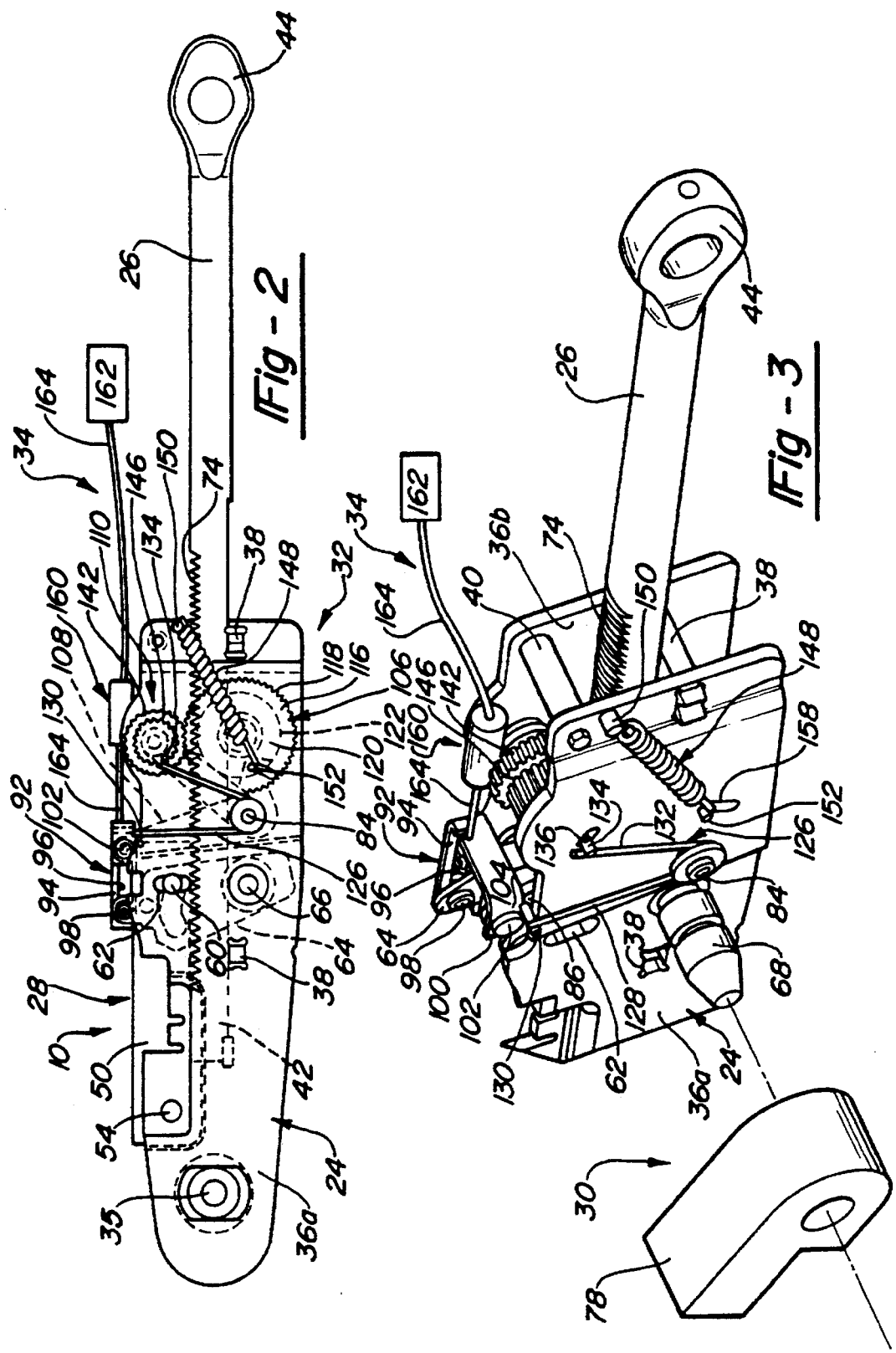

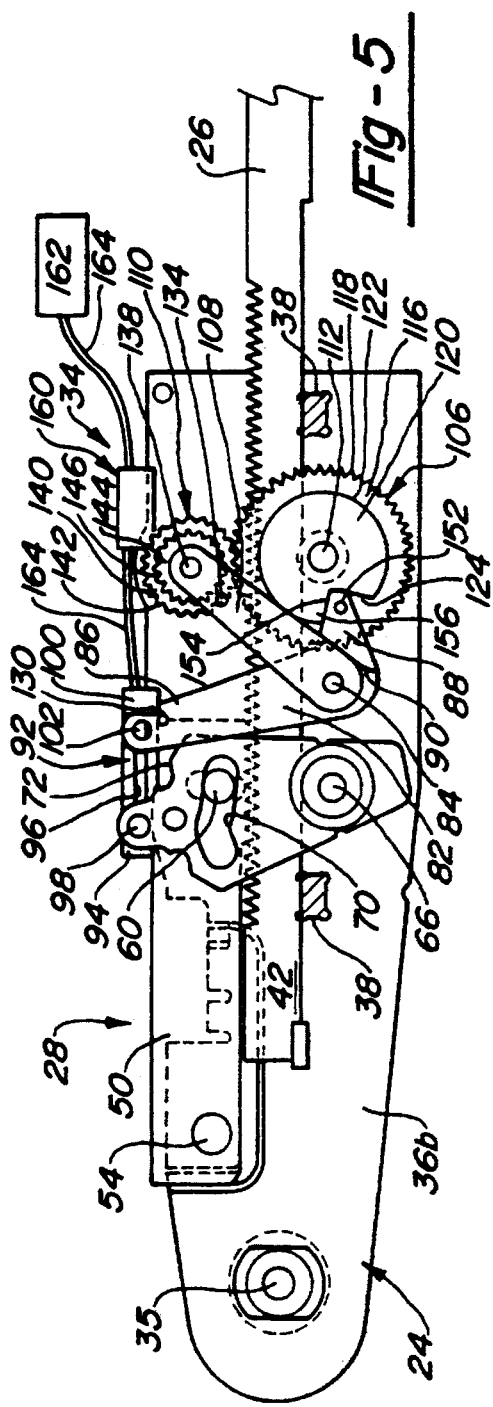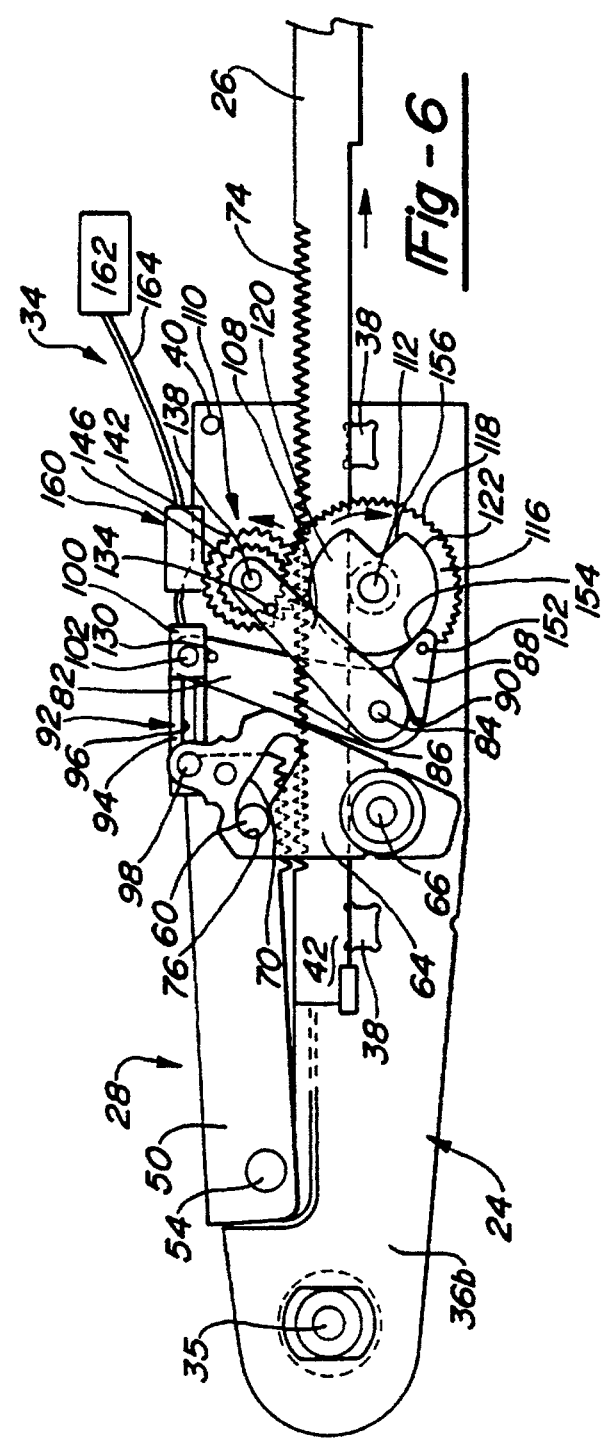

LINEAR RECLINER WITH EASY ENTRY MEMORY FEATURE

BACKGROUND OF THE INVENTION

1. Field of the Invention

The present invention relates generally to seats for motor vehicles and, more specifically, to a linear recliner assembly having an easy entry memory feature for use with vehicle seats.

2. Description of Background Art

Virtually all motor vehicles are now equipped with front seats having a recliner mechanism that can be selectively actuated for permitting the angular position of the seatback to be varied between an upright position and a fully reclined position relative to the seat bottom. In most two door vehicles, the front seats also include a seatback dump mechanism that can be selectively actuated for forwardly folding (i.e., "dumping") the seatback to permit greater access to the rear seating area of the vehicle passenger compartment.

Conventional linear recliner mechanisms are designed to be disengaged when the seatback is folded forwardly in order to obtain access to the rear seat of the vehicle passenger compartment. As such, the angular position of the seatback must be reset to the desired angular position when the seatback is returned to its upright position for occupant seating.

It is therefore desirable to provide an improved linear recliner and dump mechanism with an easy entry memory feature which insures that the seatback is returned to the previous selected angular position after the seatback has been "dumped" forward for access to the rear seat of the vehicle passenger compartment.

SUMMARY OF THE INVENTION

Accordingly, it is the object of the present invention to provide a linear recliner assembly for a vehicle seat that is operable to permit selectively reclining and dumping movement of the seatback and which has a memory feature for returning the seatback to its previous reclined position after a dumping operation has been performed.

A further object of the present invention is to provide a linear recliner assembly for a vehicle seat which is operable to permit the angular reclined position of the seatback to be adjusted independently of the memory feature.

It is a further object to provide the linear recliner assembly of the present invention with a latching mechanism that is operable in a latched mode for inhibiting reclining movement of the seatback and in an unlatched mode for permitting reclining movement of the seatback.

Still another object of the present invention is to provide a linear recliner assembly having the above-noted features and yet which is simple in structure, inexpensive to manufacture, easy to mass produce and durable in use.

These and other objects are obtained by providing a linear recliner assembly that is operable for permitting selective reclining movement of a seatback relative to a seat bottom between an upright position and a fully-reclined position. The linear recliner assembly is further operable to permit the seatback to be pivoted from any reclined position to a forward dumped position. Upon return of the seatback from its forward dumped position, the linear recliner assembly is adapted to relatch the seatback in its previous reclined position. More specifically, the linear recliner assembly includes a housing fixed to the seat bottom, a recliner rod attached to the seatback and supported for sliding movement relative to the housing, a latching mechanism for releasably latching the recliner rod to the housing, a recline actuator mechanism for controlling actuation of the latching mechanism, a memory mechanism for causing the latching mechanism to automatically relatch the seatback in the reclined position it had prior to forward dumping thereof, and a dump actuator mechanism for controlling actuation of the memory mechanism. The latching mechanism is normally operable in a latched mode for securing the recliner rod in a fixed position relative to the housing, thereby retaining the seatback in a selected reclined position. The latching mechanism is also operable in an unlatched mode wherein the recliner rod is free to move linearly relative to the housing. The recline actuator mechanism is operable for permitting a seat occupant to selectively shift the latching mechanism from its latched mode into its unlatched mode when it is desired to adjust the reclined position of the seatback. The memory mechanism is normally operable in a non-actuated mode for permitting independent actuation of the latching mechanism. However, when it is desired to move the seatback to its forward dumped position, the dump actuator mechanism is selectively actuated for automatically shifting the latching mechanism into its unlatched mode in response to the memory mechanism being shifted into an actuated mode. Moreover, the memory mechanism is operably interconnected to the latching mechanism so as to maintain the latching mechanism in its unlatched mode during forward dumping of the seatback and thereafter until the seatback is returned to its previous reclined position. When the seatback is returned to its previous reclined position, the memory mechanism is automatically returned to its non-actuated mode which, in turn, returns the latching mechanism to its latched mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings wherein:

FIG 2 enlarged side view of the linear recliner assembly shown in FIG. 1;

FIG. 3 is a perspective view of a portion of the linear recliner assembly;

FIG. 5 is a view of the seat recliner assembly showing its latching mechanism in a latched mode and its memory mechanism in a non-actuated mode; and FIG. 6 is a side view, similar to FIG. 4, showing the latching mechanism in an unlatched mode and the memory mechanism in an actuated mode.

DETAILED DESCRIPTION OF THE PREFERRED EMBODIMENTS

Figure 1:
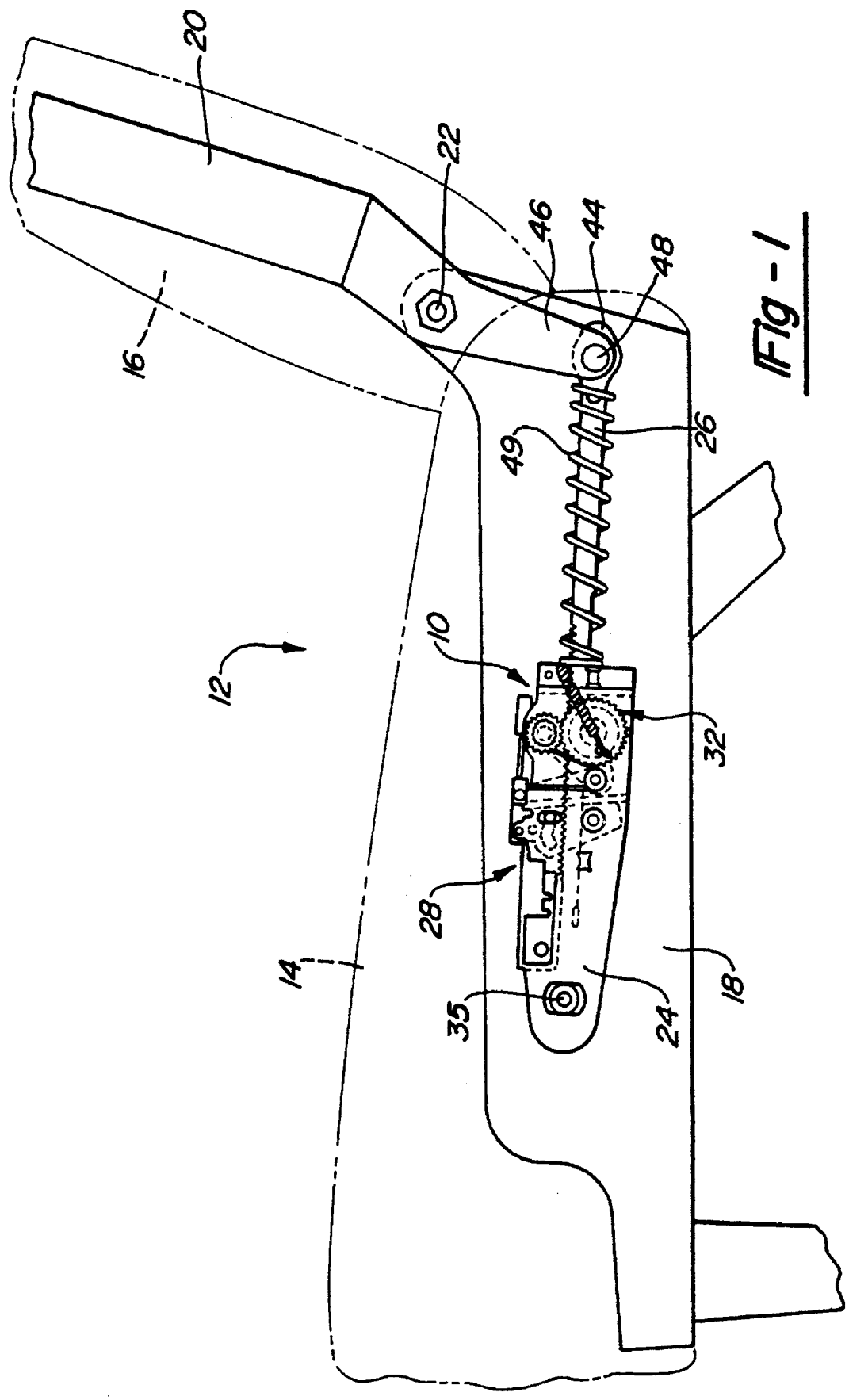
FIG. 1 is a side elevational view of a seat assembly showing the linear recliner assembly of the present invention located along an outer edge of the seat frame.
Figure 4:
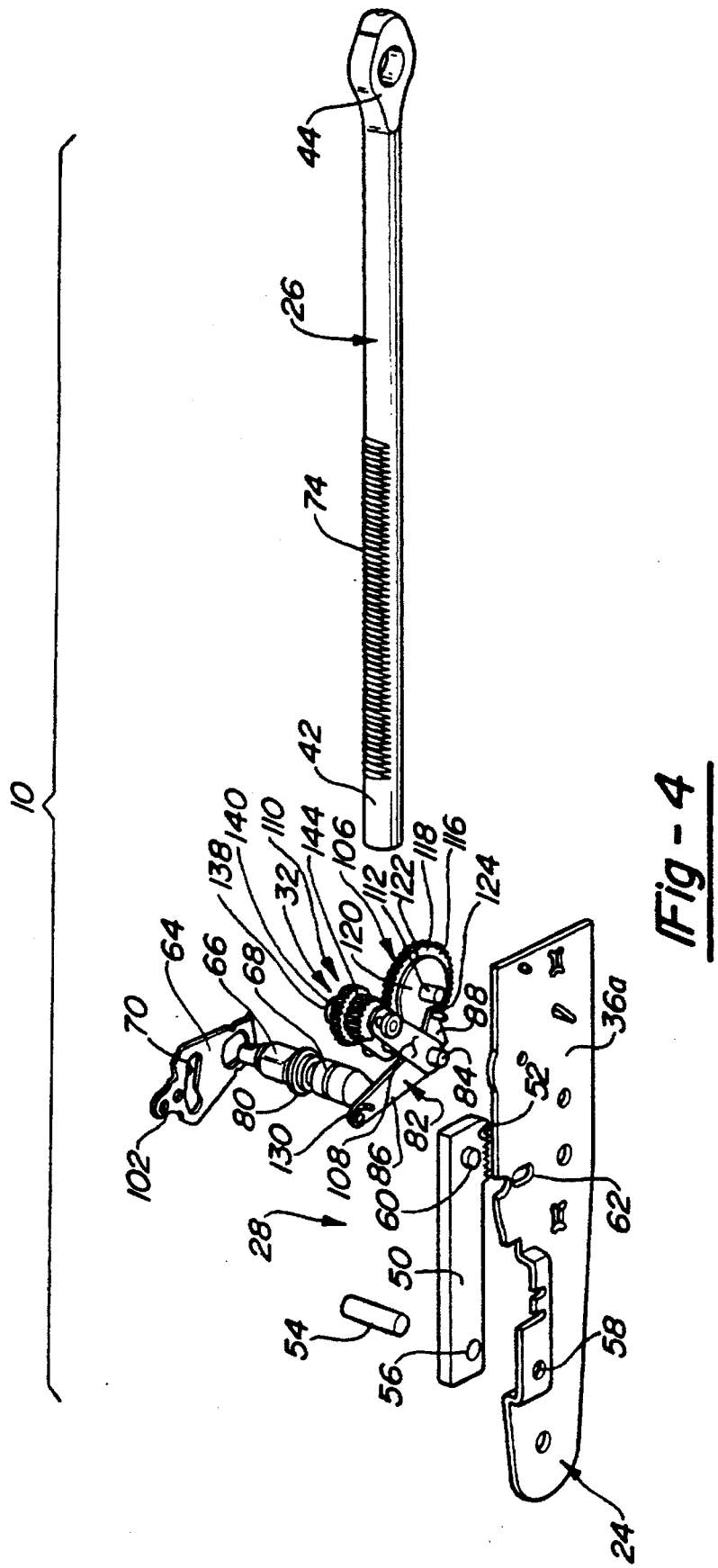
FIG. 4 is a partial exploded perspective view of the linear recliner assembly.

The present invention relates to a linear recliner assembly 10 shown in FIG. 1 incorporated into a seat assembly 12 having an upholstered seat bottom 14 and an upholstered seatback 16. Seat assembly 12 is of a type contemplated for use as the front seat in a motor vehicle. Seat bottom 14 includes a structural frame, with one of its lateral side rails being identified by reference numeral 18. The structural frame for seatback 16 includes a pair of lateral support arms 20 (one shown), each of which is pivotally attached by a pivot 22 to seat frame 18. As such, seatback 16 is supported for angular movement relative to seat bottom 14. As will be detailed, linear recliner assembly 10 is operable for permitting selective reclining movement of seatback 16 relative to seat bottom 14 between an upright position and a fully-reclined position. Linear recliner assembly 10 is further operable to permit seatback 16 to be pivoted from any reclined position to a forward dumped position to provide greater access to the area located behind seat assembly 12. Upon return of seatback 16 from its forward dumped position, linear recliner assembly 10 is adapted to latch seatback 16 in its previous reclined position.

In general, linear recliner assembly 10 includes a housing 24 fixed to seat frame 18, a recliner rod 26 attached to support arm 20 of seatback 16 and supported for sliding movement relative to housing 24, a latching mechanism 28 for releasably latching recliner rod 26 to housing 24, and a recline actuator mechanism 30 for controlling actuation of latching mechanism 28. Linear recliner assembly 10 also includes a memory mechanism 32 for causing latching mechanism 28 to automatically relatch seatback 16 in the reclined position it had (i.e., its "previous" reclined position) prior to forward dumping thereof, and a dump actuator mechanism 34 for controlling actuation of memory mechanism 32. More particularly, housing 24 is pivotably attached to side rail 18 by a fastener 35 and includes a pair of laterally-spaced housing sections 36a and 36b that are suitably interconnected, such as by clips 38 and fasteners 40. In addition, recliner rod 26 has a first end 42 slidably supported on clips 38 within housing 24 and a second end 44 which is pivotally connected to an end portion 46 of support arm 20 by a hinge pin 48. Finally, a return spring 49 is concentrically mounted on recliner rod 26 between housing 24 and its second end 44 for normally urging seatback 16 to pivot forwardly about pivots 22 to assist in returning seatback 16 from any reclined position to its upright position.

Latching mechanism 28 is supported in housing 24 for selectively allowing linear sliding movement of recliner rod 26 relative to housing 24. In particular, latching mechanism 28 is normally operable in a "latched" mode for securing recliner rod 26 in a fixed position relative to housing 24, thereby preventing movement of support arms 20 about pivots 22 so as to maintain seatback 16 in a selected reclined position. In contrast, latching mechanism 28 is also operable in an "unlatched" mode wherein recliner rod 26 is free to move linearly relative to housing 24. With latching mechanism 28 it is unlatched mode, linear movement of recliner rod 26 in a first (i.e., forward) direction relative to housing 24 results in rearward angular movement of seatback 16 about pivots 22 while linear movement of recliner rod 26 in the opposite (i.e., rearward) direction results in forward angular movement of seatback 16 about pivots 22. Recline actuator mechanism 30 is operable for permitting a seat occupant to selectively shift latching mechanism 28 from its latched mode into its unlatched mode when it is desired to adjust the reclined position of seatback 16. A biasing arrangement is also provided for normally biasing latching mechanism 28 for operation in its latched mode.

According to a preferred construction for linear recliner assembly 10, latching mechanism 28 includes a locking pawl 50 having locking teeth 52 formed thereon. Locking pawl 50 is pivotally attached to housing 24 by a pivot post 54 which is received in a pivot hole 56 formed through locking pawl 50 and pivot holes 58 formed in housing 24. Locking pawl 50 also includes a follower pin 60 that is retained in a guide slot 62 formed in housing 24. Latching mechanism 28 also includes a cam plate 64 that is fixed to an actuator shaft 66. Actuator shaft 66 is supported for rotation relative to housing 24 and includes a portion 68 extending outwardly therefrom. Cam plate 64 includes a cam slot 70 through which follower pin 60 of locking pawl 50 extends. Latching mechanism 28 is actuated by rotating cam plate 64 which, in turn, causes follower pin 60 to move due to the contour of cam slot 70. As such, the contour of cam slot 70 is designed such that rotation of cam plate 64 causes corresponding pivotal movement of locking pawl 50. In particular, FIG. 5 illustrates cam plate 64 rotated to a first position whereat follower pin 60 is positioned in a rearward portion 72 of cam slot 70 and locking pawl 50 is located in a locked position. With locking pawl 50 in its locked position, its locking teeth 52 are meshed with teeth 74 on recliner rod 26, thereby inhibiting linear movement of recliner rod 26 relative to housing 24 and establishing the latched mode of latching mechanism 28. In contrast, FIG. 6 illustrates cam plate 64 rotated to a second position whereat follower pin 60 is positioned in a forward portion 76 of cam slot 70 and locking pawl 50 is located in a released position. With locking pawl 50 in its released position, locking teeth 52 are displaced from meshed engagement with teeth 74 on recliner rod 26, thereby permitting linear movement of recliner rod 26 relative to housing 24 and establishing the unlatched mode of latching mechanism 28.

To rotate cam plate 64 between its first and second positions when it is desired to adjust the reclined position of seatback 16, recline actuator mechanism 30 is shown to include a handle 78 that is fixed to extension 68 of actuator shaft 66. A torsion spring 80 is provided on actuator shaft 66 which acts between cam plate 64 and housing 24 for normally biasing cam plate 64 toward its first position. Thus, the biasing of torsion spring 80 must be overcome before the seat occupant can rotate handle 78 sufficiently to rotate cam plate 64 from its first position to its second position for moving locking pawl 50 out of its locked position and into its released position for intentionally shifting latching mechanism 28 into its unlatched mode. Obviously, handle 78 is located adjacent to seat bottom 14 for the convenience of the seat occupant.

In general terms, memory mechanism 32 is normally operable in a "non-actuated" mode for permitting independent actuation of latching mechanism 28 via operation of handle 78 when adjustment of the reclined position of seatback 16 is desired. However, when it is desired to move seatback 16 to its forward dumped position, dump actuator mechanism 34 is selectively actuated for automatically shifting latching mechanism 28 into its unlatched mode in response to memory mechanism 32 being shifted into an "actuated" mode. Moreover, memory mechanism 32 is operably interconnected to latching mechanism 28 so as to maintain latching mechanism 28 in its unlatched mode during forward dumping of seatback 16 and thereafter until seatback 16 is returned to its previous reclined position. When seatback 16 is returned to its previous reclined position, memory mechanism 32 is automatically returned to its non-actuated mode which, in turn, returns latching mechanism 28 to its latched mode.

According to the preferred construction for linear recliner assembly 10, memory mechanism 32 includes an L-shaped release plate 82 which is supported on a shaft 84, the opposite ends of which are mounted in housing 24. Release plate 82 has a first leg segment 86 and a second leg segment 88 on which a raised stop surface 90 is formed. An actuator link 92 is provided for coupling cam plate 64 to first leg segment 86 of release plate 82. In addition, actuator link 92 is connected to dump actuator mechanism 34 for causing movement of cam plate 64 from its first position to its second position in response to movement of release plate 82 from a lock-out position (FIG. 5) to a cammed position (FIG. 6). More specifically, actuator link 92 includes a first side segment 94 having an elongated guide slot 96 through which a drive pin 98 extends that is mounted to cam plate 64. Actuator link 92 further includes a second side segment 100 that is connected to first leg segment 86 of release plate 82 via a hinge pin 102, and a cross segment 104 interconnecting first and second side segments 94 and 100 thereof.

Memory mechanism 32 is further shown to include an indexing assembly comprised of a cam gear 106, a pivot link 108, and an index gear 110. Cam gear 106 is rotatably supported on a shaft 112, the opposite ends of which are mounted in housing 24. Cam gear 106 includes a gear segment 116 having external gear teeth 118 formed thereon, and a raised cam segment 120 having a circular outer cam surface 122 and a locking detent 124. Pivot link 108 is supported on shaft 84 adjacent to release plate 82 for pivotal movement relative thereto. Pivot link 108 is normally biased away from first leg segment 86 of release plate 82 by a torsion spring 126. Torsion spring 126 is mounted on shaft 84 and has a first spring end 128 engaging a post 130 extending from first leg segment 86 of release plate 82 and a second spring end 132 engaging a post 134 extending from pivot link 108. Post 134 is shown in FIG. 3 to extend through a slot 136 formed in housing 24. Finally, index gear 110 is rotatably mounted on a shaft 138 mounted to pivot link 108. Index gear 110 includes a first gear segment 140 having external gear teeth 142 formed thereon and a second gear segment 144 having gear teeth 146 formed thereon. Index gear 110 is oriented relative to recliner rod 26 and cam gear 106 such that gear teeth 142 on first gear segment 140 are aligned with teeth 74 on recliner rod 26 and gear teeth 146 on second gear segment 144 are aligned with gear teeth 118 on cam gear 106.

Operation of memory mechanism 32 will be described. Referring specifically to FIG. 5, release plate 82 is shown in its lock-out position with its second leg segment 88 retained within locking detent 124 in cam segment 120 of cam gear 106. A biasing spring 148 is connected between a post 150 on housing 24 and a post 152 extending from second leg segment 88 of release plate 82 and through a slot 158 in housing 24 for a biasing surface 154 of second leg segment 88 against a surface 156 in locking detent 124. With release plate 82 located in its lock-out position, torsion spring 126 biases pivot link 108 against raised stop surface 90 on release plate 82 to define its disengaged position whereat gear teeth 142 on first gear segment 140 of index gear 110 are displaced from teeth 74 on recliner rod 26 and gear teeth 146 on second gear segment 144 are displaced from gear teeth 118 on cam gear 106. Additionally, actuator link 92, due to its connection to release plate 82 via hinge pin 102, is biased in a forward direction to the first or recline position shown and cam plate 64 is shown biased by torsion spring 80 to its first position. With actuator link 92 in the recline position shown, guide slot 96 permits sliding movement of drive pin 98 therein in response to movement of cam plate 64 between its first and second position when recline actuator mechanism 30 is selectively actuated to adjust the reclined position of seatback 16. Thus, FIG. 5 illustrates the operative position of the various components associated with linear recliner assembly 10 when memory mechanism 32 is operating in its non-actuated mode.

When it is desired to move seatback 16 from any reclined position to its forwardly dumped position, dump actuator mechanism 34 is actuated for moving actuator link 92 in a rearward direction to the second or dump position shown in FIG. 6. Such movement of actuator link 92 causes release plate 82 to be forcibly pivoted, in opposition to the biasing of torsion spring 126, to its cammed position. With release plate 82 in its cammed position, its second leg segment 88 is released from locking detent 124 and torsion spring 126 causes pivot link 108 to pivot to its engaged position whereat gear teeth 142 on first gear segment 140 of index gear 110 are meshed with teeth 74 on recliner rod 26 and gear teeth 146 on second gear segment 144 of index gear 110 are meshed with gear teeth 118 on cam gear 106. Such meshing of gear teeth 142 on first gear segment 140 of index gear 110 with teeth 74 on recliner rod 26 acts to identify the current position of recliner rod 26 relative to housing 24 and thus the current reclined position of seatback 16. Additionally, such rearward movement of actuator link 92 to its dump position causes the front end of guide slot 96 to engage drive pin 98 which, in turn, causes cam plate 64 to be pivoted, in opposition to torsion spring 80, to its second position for automatically shifting latching mechanism 28 into its unlatched mode. Since latching mechanism 28 is in its unlatched mode, initial forward angular movement of seatback 16 about pivots 22 toward its dumped position causes recliner rod 26 to move linearly in a rearward direction. This rearward linear movement of recliner rod 26 causes index gear 110 to rotate in a first direction (i.e., counterclockwise) which, in turn, causes cam gear 106 to rotate in a first direction (i.e., clockwise). Such rotation of cam gear 106 causes surface 154 of second leg segment 88 to bear against cam surface 122 of cam segment 120, whereby release plate 82 is held in its cammed position during forward dumping of seatback 16. As such, when release plate 82 is in its cammed position, actuator link 92 is held in its dump position which holds cam plate 64 in its second position and locking pawl 50 in its released position. Thus, FIG. 6 illustrates the operative position of the various components associated with linear release assembly 10 when memory mechanism 32 is in its actuated mode.

When it is desired to return seatback 16 from its forward dumped position, seatback 16 is pivoted rearwardly about pivots 22 which causes recliner rod 26 to move linearly in a forward direction. This forward linear movement of recliner rod 26 causes index gear 110 to rotate in a second direction (i.e., clockwise) which, in turn, causes cam gear 106 to rotate in a second direction (i.e., counterclockwise). Such rotation of cam gear 106 causes surface 154 of second leg segment 88 to continue to bear against cam surface 122 until seatback 16 is located in its previous reclined position. At this seatback position, second leg segment 88 of release plate 82 is disengaged from cam surface 122 and torsion spring 126 is permitted to forcibly pivot release plate 82 from its cammed position of FIG. 6 to its lock-out position of FIG. 5, whereby second end segment 88 is again retained within locking detent 124. Such movement of release plate 82 shifts memory mechanism into its non-actuated mode and causes forward sliding motion of actuator link 92 to its recline position. As will be appreciated, such forward sliding movement of actuator link 92 permits cam plate 64 to move from its second position to its first position due to the biasing of torsion spring 80, thereby moving locking pawl 50 from its released position to its locked position for shifting latching mechanism 28 into its latched mode.

The number of teeth associated with each gear segment of index gear 110 and cam gear 106 are selected to provide a predetermined gear reduction such that, during full forward dumping of seatback 16, surface 154 of second leg segment 88 maintains engagement with cam surface 122 in response to rotation of cam gear 106 in its first direction without re-entering locking detent 124. Thus, cam surface 122 of cam gear 106 insures that locking pawl 50 of latching mechanism 28 remains in its released position until seatback 16 is returned to its previously selected reclined position. This is because index gear 110, when rotatably driven by teeth 74 of recliner rod 26, is operable to rotatably index cam gear 106 a certain angular amount in order to dump seatback 16 forward. Cam gear 106 must be rotatably indexed in the opposite direction precisely the same angular amount in order for second leg segment 88 of release plate 82 to engage locking detent 124 of cam gear 106 and allow release arm 82 and cam plate 64 to be returned to the positions shown in FIG. 5. In addition, the resilient connection provided by torsion spring 126 between pivot link 108 and release plate 82 results in pivot link 108 being located in its engaged position prior to movement of locking pawl 50 to its released position. As such, index gear 110 is meshed with teeth 74 on recliner rod 26 prior to linear movement thereof.

To provide means for moving release plate 82 from its lock-out position to its cammed position, dump actuator mechanism 34 is shown to include a cable assembly 160 interconnecting actuator link 92 to a dump operator, schematically shown by block 162. Cable assembly 160 includes an inner cable 164 having a first end connected to cross segment 104 of actuator link 92, and a second end coupled to dump operator 162. Dump operator 162 can be any pull-type or pivoting handle or other equivalent device mounted to seat assembly 12 in a convenient location for actuation by the vehicle occupants.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A linear recliner assembly for use with a seat assembly having a seatback supported for pivotal movement relative to a seat bottom, comprising:

a housing secured to the seat bottom;

a recliner rod having a first end attached to the seatback and a second end supported for sliding movement relative to said housing and having teeth formed thereon;

a latching mechanism normally operable in a latched mode for securing said recliner rod in a fixed position relative to said housing for retaining the seatback in a reclined position, said latching mechanism further operable in an unlatched mode for releasing said recliner rod for sliding movement relative to said housing;

a recline actuator mechanism operably coupled to said latching mechanism for selectively shifting said latching mechanism from its latched mode into its unlatched mode to permit adjustment of the reclined position of the seatback;

a memory mechanism that is normally operable in a non-actuated mode for permitting independent actuation of said latching mechanism, said memory mechanism further operable in an actuated mode for automatically shifting said latching mechanism into its unlatched mode to permit movement of the seatback from its reclined position to a forward dumped position, said memory mechanism including an index gear that is normally disengaged from said teeth of said recliner rod when said memory mechanism is in said non-actuated mode, said index gear is brought into meshed engagement with said teeth on said recliner rod when said memory mechanism is shifted into said actuated mode such that said index gear is rotatably indexed in a first direction through a certain amount of angular motion in response to movement of said recliner rod upon movement of the seatback from its reclined position to its forward dumped position, and wherein said index gear is rotatably indexed in a second direction through said certain amount of angular motion in response to movement of said recliner rod due to movement of the seatback from its forward dumped position to its reclined position for causing said memory mechanism to be shifted into said non-actuated mode and said latching mechanism into said latched mode for relatching the seatback in its reclined position; and a dump actuator mechanism for selectively shifting said memory mechanism from said non-actuated mode to said actuated mode.

2. A linear recliner assembly for use in a seat assembly having a seatback supported for pivotal movement relative to a seat bottom, comprising:

a housing secured to the seat bottom;

a recliner rod having a first end attached to the seatback and a second end supported in said housing, said second end of said recliner rod having teeth formed thereon;

a locking pawl supported from said housing for movement between a locked position inhibiting movement of said recliner rod relative to said housing and a released position permitting movement of said recliner rod, whereby movement of said recliner rod in a first direction corresponds to rearward pivotal movement of the seatback toward a fully-reclined position and movement of said recliner rod in a second direction corresponds to forward pivotal movement of the seatback toward a forward dumped position;

a first biasing mechanism for biasing said locking pawl toward said locked position;

a recliner actuator mechanism operably connected to said locking pawl for moving said locking pawl from said locked position to said released position to permit adjustment of the reclined position of the seatback;

a cam gear rotatably supported in said housing, said cam gear having a gear segment with gear teeth formed thereon and a cam segment having a cam surface with a locking detent formed therein;

a release plate supported from said housing for movement between a lock-out position whereat a locking segment thereof is retained in said locking detent for preventing rotation of said cam gear and a cammed position whereat said locking segment is released from said locking detent for permitting rotation of said cam gear;

a second biasing mechanism for biasing said release plate toward said lock-out position;

an index gear having gear teeth and which is operably supported for movement with said release plate such that when said release plate is in said lock-out position said gear teeth of said index gear are displaced from said teeth on said recliner rod and said gear teeth on said gear segment of said cam gear, and when said release plate is in said cammed position said gear teeth of said index gear are meshed with said teeth on said recliner rod and said gear teeth on said cam gear;

a link coupling said locking pawl to said release plate and which is operable in a first position to locate said release plate in said lock-out position while permitting movement of said locking pawl between said locked and released positions, said link is operable in a second position for locating said release plate in said cammed position and said locking pawl in said released position; and a dump actuator mechanism for moving said link from said first position to said second position when it is desired to dump the seatback from its reclined position to its forward dumped position, such movement of said link to said second position causing said index gear to engage said teeth on said recliner rod at a position corresponding to the reclined position of the seatback whereby subsequent forward pivotal movement of the seatback to its dumped position causes said recliner rod to move in said second direction which causes said index gear to rotate said cam gear in a first direction, such rotation of said index gear causing said locking segment of said release plate to engage said cam surface of said cam gear and be held in said cammed position for holding said link in said second position, and wherein subsequent rearward pivotal movement of the seatback from its dumped position causes said recliner rod to move in said first direction which causes said index gear to rotate said cam gear in a second direction until said recliner rod is located in said position corresponding to the previous reclined position of the seatback whereat said locking segment of said release plate disengages said cam surface which permits said second biasing mechanism to move said release plate to said lock-out position which causes said link to move to said first position for permitting said first biasing mechanism to move said locking pawl to its locked position, thereby latching the seatback in its previous reclined position.

3. The linear recliner assembly of claim 2 wherein said index gear includes a first gear segment having gear teeth adapted to engage said teeth on said recliner rod, and a second gear segment having gear teeth adapted to engage said gear teeth on said cam gear.

4. The linear recliner assembly of claim 2 wherein said index gear is rotatably mounted to a pivot link which is biased by said second biasing mechanism toward a disengaged position relative to said release plate for locating said gear teeth of said index gear at a position displaced from said recliner rod teeth and cam gear teeth when said release plate is in said lock-out position, and wherein movement of said release plate to said cammed position causes said pivot link to move to an engaged position whereat its gear teeth are meshed with said recliner rod teeth and said cam gear teeth.

5. The linear recliner assembly of claim 2 wherein movement of said locking pawl to said locked position causes locking teeth formed thereon to meshingly engage said teeth on said recliner rod for inhibiting linear movement thereof relative to said housing.

6. The linear recliner assembly of claim 2 further comprising a cam plate coupled to said recline actuator mechanism for movement between a first position and a second position, said cam plate including a cam slot within which a follower pin extends that is mounted to said locking pawl such that movement of said cam plate between said first position and said second position causes concurrent movement of said locking pawl between said locked position and said released position, and wherein said link is coupled to said cam plate for causing movement of said cam plate from its first position to its second position in response to movement of said link from its first position to its second position.

7. The linear recliner assembly of claim 6 further comprising a guide slot in said link and a drive pin fixed to said cam plate extending into said guide slot, said guide slot operable for permitting movement of said cam plate between its first and second positions via actuation of said recline actuator mechanism when said link is in its first position, and wherein movement of said link to its second position via actuation of said dump actuator mechanism causes said cam plate to be forcibly moved to its second position.

8. A linear recliner assembly for use in a seat assembly having a seatback supported for pivotal movement relative to a seat bottom, comprising:

a housing mounted to the seat body;

a recliner rod having a first end mounted to the seatback and a second end supported by said housing and having teeth formed thereon;

a locking pawl having locking teeth and which is mounted to said housing for movement between a locked position whereat said locking teeth engage said teeth on said recliner rod and a released position whereat said locking teeth are displaced from said teeth on said recliner rod;

a first biasing mechanism for biasing said locking pawl towards said locked position;

a recline actuator mechanism for moving said locking pawl from said locked position to said released position to permit movement of said recliner rod relative to said housing for adjusting the reclined position of the seatback relative to the seat bottom;

a cam gear rotatably supported from said housing, said cam gear having a gear segment with gear teeth formed thereon, and a cam segment having a cam surface with a locking detent formed therein;

a release plate supported by said housing for movement between a lock-out position and a cammed position, said release plate having a follower segment adapted to engage said locking detent when said release plate is in said lock-out position and which is adapted to engage said cam surface when said release plate is in said cammed position;

a second biasing mechanism for biasing said release plate toward said lock-out position;

a pivot arm mounted to said housing for pivotal movement and having an index gear rotatably mounted thereto, said pivot arm movable from a disengaged position to an engaged position in response to movement of said release plate from said lock-out position to said cammed position, said index gear being displaced from said recliner rod and said cam gear when said pivot arm is in said disengaged position and said index gear being meshed with said teeth on said recliner rod and said teeth on cam gear when said pivot arm is in said engaged position; and a dump actuator mechanism coupling said locking pawl to said release plate such that actuation of said dump actuator mechanism causes said release plate to move from said lock-out position to said cammed position and said locking pawl to move from said locked position to said released position when it is desired to move the seatback from its reclined position to a forwardly dumped position, whereby subsequent forward dumping movement of the seatback results in linear movement of said recliner rod which causes said index gear to rotatably drive said cam gear in a first direction through a certain angular distance, and wherein subsequent movement of the seatback from its forward dumped position causes said recliner rod to move for causing said index gear to rotatably drive said cam gear in an opposite direction through said certain angular distance for returning said follower segment of said release cam into engagement with said locking detent and returning said looking pawl to said looked position whereby the seatback is relatched in its previous reclined position.

9. A seat assembly comprising:

a seat bottom;

a seatback supported for pivotal movement relative to said seat bottom;

a linear recliner assembly including a housing secured to said seat bottom, a recliner rod having a first end attached to said seatback and a second end supported for sliding movement relative to said housing and having teeth formed thereon, a latching mechanism operable in a latched mode for securing said recliner rod in a fixed position relative to said housing for retaining said seatback in a reclined position, said latching mechanism further operable in an unlatched mode for releasing said recliner rod for movement relative to said housing, and a memory mechanism operable in a non-actuated mode for permitting independent actuation of said latching mechanism, said memory mechanism further operable in an actuated mode for automatically shifting said latching mechanism into its unlatched mode to permit movement of said seatback from its reclined position to a forward dumped position, said memory mechanism including an index gear that is normally disengaged from said teeth of said recliner rod when said memory mechanism is in its non-actuated mode, said index gear is adapted to meshingly engage said teeth on said recliner rod when said memory mechanism is shifted into its actuated mode such that said index gear is rotatably indexed in a first direction through a certain amount of angular motion in response to movement of said recliner rod caused by movement of said seatback from its reclined position to its forward dumped position, and wherein said index gear is thereafter rotatably indexed in a second direction through said certain amount of angular motion in response to movement of said recliner rod due to movement of said seatback from its forward dumped position to its reclined position for causing said memory mechanism to be shifted into its non-actuated mode and said latching mechanism into its latched mode for relatching said seatback in its reclined position;

a recline actuator mechanism for selectively shifting said latching mechanism from its latched mode into its unlatched mode to permit adjustment of the reclined position of said seatback; and a dump actuator mechanism for selectively shifting said memory mechanism from its non-actuated mode to its actuated mode.

10. The seat assembly of claim 9 wherein said memory mechanism of said linear recliner assembly further includes:

a cam gear rotatably supported from said housing and having a gear segment and a cam segment, said cam segment having a cam surface and a locking detent formed therein;

a release plate supported from said housing for movement between a lock-out position whereat a locking segment thereof is retained in said locking detent to prevent rotation of said cam gear when said memory mechanism is in said non-actuated mode and a cammed position whereat said locking segment is released from said locking detent for permitting rotation of said cam gear when said memory mechanism is in said actuated mode, and wherein said index gear is operably supported for movement with said release plate such that said index gear is in a disengaged position when said release plate is in said lock-out position and an engaged position when said release plate is in said cammed position, said index gear meshing with both said gear segment of said cam gear and said teeth of said recliner rod when in said engaged position, and wherein said index gear is disengaged from said gear segment of said cam gear and said teeth of said recliner rod when in said disengaged position.

11. The seat assembly of claim 10 wherein said dump actuator is operably coupled to said release plate for moving said release plate from said lock-out position to said cammed position.

12. A linear recliner assembly for use in a seat assembly having a seatback supported for pivotal movement relative to a seat bottom, comprising:

a housing secured to the seat bottom;

a recliner rod having a first end attached to the seatback and a second end supported in said housing, said second end of said recliner rod having teeth formed thereon;

a locking pawl supported from said housing for movement between a locked position inhibiting movement of said recliner rod relative to said housing and a released position permitting movement of said recliner rod, whereby movement of said recliner rod in a first direction corresponds to rearward pivotal movement of the seatback toward a fully-reclined position and movement of said recliner rod in a second direction corresponds to forward pivotal movement of the seatback toward a forward dumped position;

a recliner actuator mechanism for moving said locking pawl from its locked position to its released position to permit adjustment of the reclined position of the seatback;

a cam gear rotatably supported in said housing, said cam gear including a gear segment and a cam segment having a cam surface with a locking detent formed therein;

a release plate supported from said housing for movement between a lock-out position whereat a locking segment thereof is retained in said locking detent for preventing rotation of said cam gear and a cammed position whereat said locking segment is released from said locking detent for permitting rotation of said cam gear;

an index gear operable supported for movement with said release plate such that when said release plate is in its lockout position said index gear is disengaged from said teeth on said recliner rod and said gear segment of said cam gear, and when said release plate is in its cammed position said index gear is in meshed engagement with said teeth on said recliner rod and said gear segment of said cam gear;

a coupling mechanism interconnecting said locking pawl to said release plate and which is operable in a first position to locate said release plate in its lock-out position while permitting movement of said locking pawl between its locked and released positions, and said coupling mechanism is operable in a second position for locating said release plate in its cammed position and said locking pawl in its released position; and a dump actuator mechanism for moving said coupling mechanism from its first position to its second position when it is desired to dump the seatback from its reclined position to its forward dumped position, such movement of said coupling mechanism to its second position causes said index gear to meshingly engage said teeth on said recliner rod at a position corresponding to the reclined position of the seatback whereby subsequent forward pivotal movement of the seatback to its dumped position causes said recliner rod to move in said second direction which causes said index gear to rotate said cam gear in a first direction, such rotation of said cam gear in said first direction causes said locking segment of said release plate to engage said cam surface for holding said release plate in its cammed position, and wherein subsequent rearward pivotal movement of the seatback from its dumped position causes said recliner rod to move in said first direction which causes said index gear to rotate said cam gear in a second direction until said recliner rod is located in said position corresponding to the previous reclined position of the seatback whereat said locking segment of said release plate disengages said cam surface of said cam gear and engages said locking detent thereof whereby said release plate moves to its lock-out position for latching the seatback in its previous reclined position.

* * * * *